United States Patent
Pascucci et al.

(10) Patent No.: US 7,143,873 B2
(45) Date of Patent: Dec. 5, 2006

(54) MOTOR VEHICLE BRAKE SYSTEM COMPRISING A PARKING BRAKE FUNCTION AND ELECTROMECHANICAL WHEEL BRAKE FOR SUCH A MOTOR VEHICLE BRAKE SYSTEM

(75) Inventors: Antonio Pascucci, Seefeld (DE); Henry Hartmann, Gilching (DE); Martin Schautt, München (DE)

(73) Assignee: Estop GmbH, Grafrath (DE)

( * ) Notice: Subject to any disclaimer, the term of this patent is extended or adjusted under 35 U.S.C. 154(b) by 90 days.

(21) Appl. No.: 10/512,173

(22) PCT Filed: Apr. 28, 2003

(86) PCT No.: PCT/EP03/04431

§ 371 (c)(1),
(2), (4) Date: Oct. 21, 2004

(87) PCT Pub. No.: WO03/091591

PCT Pub. Date: Nov. 6, 2003

(65) Prior Publication Data

US 2005/0167212 A1 Aug. 4, 2005

(30) Foreign Application Priority Data

Apr. 26, 2002 (DE) .............................. 102 18 825
Jun. 11, 2002 (DE) ......................... 202 09 038 U

(51) Int. Cl.
*F16D 55/08* (2006.01)
*F16D 55/16* (2006.01)

(52) U.S. Cl. .................... 188/72.7; 188/156; 188/72.2; 188/136

(58) Field of Classification Search .................. 188/69, 188/71.7, 72.7, 156, 157, 158, 162, 72.2, 188/136, 70.3, 106 P, 69 X, 156 X, 72.2 X, 188/136 X
See application file for complete search history.

(56) References Cited

U.S. PATENT DOCUMENTS 3,430,736 A * 3/1969 Long .......................... 188/72.7

(Continued)

FOREIGN PATENT DOCUMENTS

DE           2052496          5/1971

(Continued)

*Primary Examiner*—Devon KRamer
(74) *Attorney, Agent, or Firm*—Wood, Herron & Evans, LLP

(57) ABSTRACT

The present invention relates to a motor vehicle brake system, having at least one first and at least one second electromechanical wheel brake (10), which each comprise an electric actuator for generating an actuating force and a self-boosting device for automatically boosting the actuating force generated by the actuator in order to press a friction element against a rotatable component (14) of the wheel brake (10) that is to be braked, wherein each self-boosting device comprises a wedge (18), which is supported against an associated abutment (22) and has at least one wedge face (20, 20') disposed at an angle of slope ($\alpha$). In order to realize a parking brake function, the self-boosting device of the first wheel brake comprises at least one wedge face (20), which is used to boost the force in brake operations during forward travel, and the self-boosting device of the second wheel brake comprises at least one wedge face (20'), which is used to boost the force in braking operations during reverse travel. In many embodiments, the angle of slope ($\alpha$) of the said wedge faces (20, 20') is so selected that the wheel brakes (10) in any case with normally prevailing coefficients of friction $\mu$ are self-locking. In the parking brake function the friction element of the first wheel brake, by utilizing the wedge face (20) used to boost the force in braking operations during forward travel, and the friction element of the second wheel brake, by utilizing the wedge face (20') used to boost the force in braking operations during reverse travel, are clamped against the component of the wheel brake (10) that is to be braked. The invention also relates to an electromechanical brake for such a motor vehicle brake system.

30 Claims, 11 Drawing Sheets

U.S. PATENT DOCUMENTS

Figure 1:
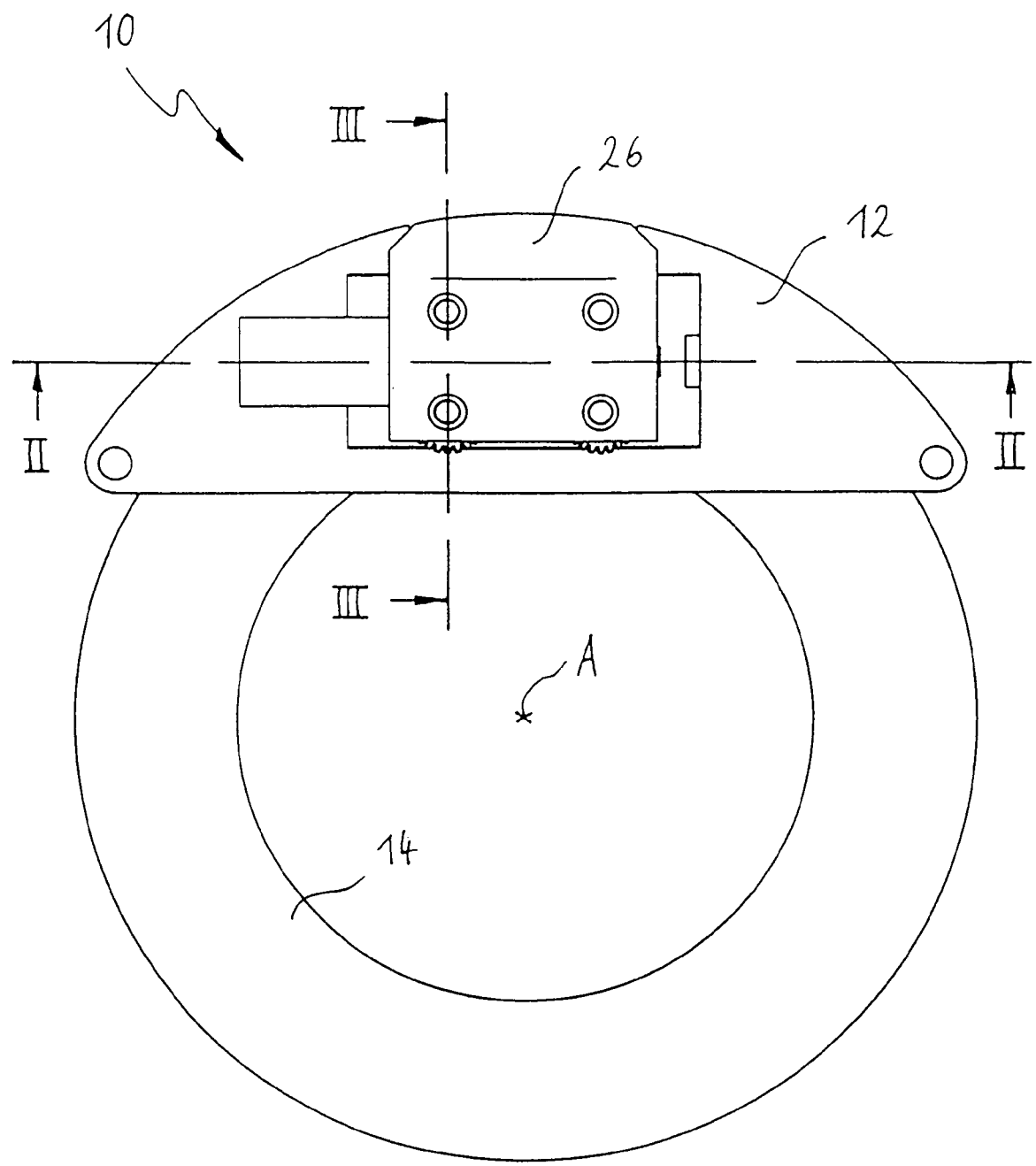

| | | | |
|---|---|---|---|
| 3,662,864 A * | 5/1972 | Evans | 188/72.2 |
| 4,457,408 A * | 7/1984 | Montalvo, III | 188/72.2 |
| 6,318,513 B1 * | 11/2001 | Dietrich et al. | 188/72.7 |
| 6,752,247 B1 * | 6/2004 | Hartsock | 188/72.7 |
| 6,978,868 B1 * | 12/2005 | Schautt | 188/72.7 |

FOREIGN PATENT DOCUMENTS

| | | |
|---|---|---|
| DE | 19741868 C1 | 1/1999 |
| DE | 19819564 C2 | 6/2000 |
| DE | 19931228 A1 | 1/2001 |
| DE | 10037055 * | 2/2002 |
| DE | 10037055 A1 | 2/2002 |
| DE | 10056451 A1 | 5/2002 |

* cited by examiner

MOTOR VEHICLE BRAKE SYSTEM COMPRISING A PARKING BRAKE FUNCTION AND ELECTROMECHANICAL WHEEL BRAKE FOR SUCH A MOTOR VEHICLE BRAKE SYSTEM

The invention relates to a motor vehicle brake system with self-boosting electromechanical wheel brakes and to a self-boosting electromechanical wheel brake for such a motor vehicle wheel brake system.

Self-boosting electromechanical wheel brakes are known as such, e.g. from the German patent specification DE 198 19 564 C2. An electromechanical wheel brake with self-boosting comprises an electric actuator, which generates an actuating force and transmits it via a self-boosting device to a friction element in order to press the friction element against a rotatable component of the wheel brake that is to be braked. The self-boosting device comprises a wedge-shaped element having a wedge face disposed at an angle of slope α. A corresponding friction-element-side wedge face formed e.g. on the friction lining carrier interacts with the wedge face of the wedge element in that the rotating component of the wheel brake that is to be braked drives the friction element, which during the braking operation is pressed against the component to be braked, slightly in the direction of rotation, with the result that the two wedge faces move relative to one another and the friction element is pressed even more strongly against the wheel brake component to be braked, without an increase of the actuating force supplied by the actuator being required for this purpose. The angle of slope α of the wedge faces may in said case be so selected that during normal braking operations an actuating force need be summoned up only initially by the actuator in order to press the friction element against the brake component to be braked and that at a further stage of the braking operation no actuating forces or at least only slight actuating forces are required.

The characteristic feature of self-boosting electro-mechanical brakes, namely the self-boosting device, makes it impossible to borrow concepts for achieving a parking brake function that are known from directly actuated electromechanical wheel brakes.

The underlying object of the invention is, in a motor vehicle brake system using self-boosting electromechanical wheel brakes, to provide a parking brake function and to indicate a self-boosting electromechanical wheel brake that is suitable for such a motor vehicle brake system.

According to the invention this object is achieved by a motor vehicle brake system having the features indicated in claim 1. Accordingly, in order to realize a parking brake function the self-boosting device of at least one first wheel brake has at least one wedge face, which is disposed at an angle of slope and used for boosting the force in braking operations during forward travel, while the self-boosting device of at least one second wheel brake has at least one wedge face, which is disposed at an angle of slope and used for boosting the force in braking operations during reverse travel. In the parking brake function the friction elements of the first wheel brake are clamped against the component of the wheel brake to be braked by utilizing the wedge face used to boost the force in braking operations during forward travel, and the friction elements of the second wheel brake are clamped against the component of the wheel brake to be braked by utilizing the wedge face used to boost the force in braking operations during reverse travel. It is thereby ensured that a vehicle secured by the parking brake function of the motor vehicle brake system according to the invention is incapable of movement either in forward direction or in backward direction. A force pushing the vehicle in forward direction would namely lead to an automatic stronger application of the first wheel brake while, conversely, a force pushing the vehicle in backward direction would lead to a stronger application of the second wheel brake.

As a rule, particularly in two-axled vehicles, the first wheel brake will be a front wheel brake and the second wheel brake will be a rear wheel brake. However, the first and the second wheel brake might alternatively be disposed on one and the same axle of a vehicle, e.g. on a live axle of a tractor.

In principle, to achieve the parking brake function it is already sufficient when in each case a first and a second wheel brake, which are preferably disposed diagonally opposite on the vehicle, are applied in the described manner. Normally, however, to increase the brake force achieved in the parking brake position two first wheel brakes and two second wheel brakes, preferably two front and two rear wheel brakes, will be applied in the described manner. Alternatively, it is also possible in the parking brake position to apply the wheel brakes axle-wise in such a way that in the parking brake function the one wheel brake utilizes the wedge face used to boost the force during forward travel and the other brake wheel utilizes the wedge face used to boost the force during reverse travel. This however presupposes that all of the wheel brakes are equipped in each case with wedge faces both for boosting the force in braking operations during forward travel and for boosting the force in braking operations during reverse travel. If the motor vehicle has a plurality of rear axles, the wheel brakes of all of the rear axles or of only some of the rear axles may be used to realize the parking brake function.

It should be expressly pointed out at this point that the motor vehicle brake system according to the invention is intended primarily for the implementation of service braking operations, and that the parking brake function realized in accordance with the invention is an additional function of the brake system. Since the front wheel brakes during normal service braking operations have to summon up up to 80% of the brake force, in simple embodiments of the motor vehicle brake system according to the invention the rear wheel brakes may be designed in such a way that they do not participate in forward braking operations, i.e. each rear wheel brake has only one wedge face, which is used to boost the force in braking operations during reverse travel. Since during reverse travel the maximum speed of a vehicle is limited, in such a simple embodiment the front wheel brakes may moreover be designed in such a way that they do not participate in a braking operation of a backward moving vehicle, i.e. the front wheel brakes have only such wedge faces as are used to boost the force in braking operations during forward travel. If a motor vehicle brake system is required to meet higher standards, e.g. if it is fitted in high-speed and/or heavy vehicles, then usually at least the rear self-boosting electromechanical wheel brakes are designed in such a way that they may brake in both directions of travel, i.e. these wheel brakes have wedge faces for forward travel and reverse travel. Because the front wheel brakes, owing to the dynamic axle load displacement that occurs during normal operation (forward travel), are in any case designed to cope with higher brake forces, the brake force that may be generated by such a brake counter to the wedge direction, i.e. during reverse travel, is also mostly adequate, especially as the dynamic axle load displacement that occurs in a braking operation during reverse travel removes load from the front axle and prevents the build-up of higher brake forces.

According to a preferred refinement of the motor vehicle brake system according to the invention, in which the angle of slope of the said wedge faces is selected in such a way that the wheel brakes are self-locking in any case given normally prevailing coefficients of friction between the friction element and the wheel brake component to be braked, in order to achieve the parking brake function initially a distance-controlled application of each wheel brake participating in the parking brake function is effected. Here, what is meant by the term "distance-controlled application" is that, in order to achieve the parking brake function, each wheel brake initially travels a predetermined infeed distance in order thereby to achieve a desired defined amount of holding force. The predetermined infeed distance may not be too large in order to avoid too strong an application of the wheel brake, which might occur e.g. when a brake is very hot owing to many preceding service braking operations. The distance-controlled application of each wheel brake is followed by a further actuation of the actuator of the brake with only low force, described as "zero-force" correction, in order subsequent to the application of the brake to restore a specific actuating clearance relative to the wedge of the self-boosting device that enables the wedge, when external forces act upon the vehicle and endeavour to shift the vehicle, to apply the wheel brake even more strongly. Here, by the term "zero-force" is meant a force that, compared to the previously occurring brake application, is negligibly low.

According to a preferred embodiment of the previously described motor vehicle brake system, the distance-controlled brake application is effected over a predetermined infeed distance up to a predetermined brake application force and is terminated when either the predetermined infeed distance or the predetermined brake application force has been reached. This reliably prevents too strong an application of a wheel brake that is very hot owing to the preceding operation. Because, when a wheel brake is hot, the components participating in the braking operation expand, an exclusively distance-controlled brake application would lead to a brake application force that was clearly too high. The additional monitoring of the brake application force achieved during the brake application operation prevents this by terminating the brake application operation when the predetermined brake application force has been reached, even if the predetermined infeed distance has not yet been travelled. In such an embodiment, the zero-force correction of the actuator of the brake occurs only when the predetermined infeed distance has been reached. If the brake application operation has been terminated owing to attainment of the predetermined brake application force, it is namely impossible to restore an actuating clearance at the wedge by a "zero-force" correction of the actuator.

The previously mentioned, predetermined brake application force is advantageously a fraction of the maximum actuator force, being for example 30% of the maximum force that may be generated by the actuator.

In order to maintain the parking brake function, after a predetermined time interval and/or in dependence upon the temperature of brake components relevant to the brake application a further application of the wheel brake is advantageously effected up to a predetermined brake application force, which may be the same as the previously mentioned predetermined brake application force. The predetermined time interval is, for example, so selected that an initially hot brake may cool down and the force-controlled brake application then has, as it were, a reclamping effect. Alternatively or additionally, the force-controlled brake application may be effected in a temperature-dependent manner, e.g. in dependence upon the temperature of a brake disc, a brake caliper or similar brake components relevant to the application of the brake. As an initially set brake application force decreases as the temperature of the brake falls, it is thereby guaranteed that a desired holding force is reliably maintained even over extended periods of time. The further application of the wheel brake may comprise one or even a plurality of brake application operations.

It has already been mentioned that, in a self-boosting electromechanical wheel brake, external forces acting upon the vehicle in the parking brake position may bring about an automatic further application of the wheel brake. This is possible because the wedge arrangement, which is used for self-boosting and upon which the actuator of the brake acts, has a specific clearance between the actuating element of the actuator and the wedge, upon which the actuating element of the actuator acts. An automatic further application of the wheel brake in parking brake position may therefore occur until the said clearance is used up. In order, after external forces have acted upon a vehicle secured by means of the parking brake function of the motor vehicle brake system according to the invention, to restore a state, in which a further automatic application of the wheel brakes owing to external forces is possible, according to a preferred refinement a zero-force correction of the actuator of each wheel brake participating in the parking brake function is effected when the clearance existing in immobilizing direction between the actuator and the wedge has been used up. The zero-force correction is therefore intended only to restore the said clearance, not however summon up an additional immobilizing force.

In the embodiments described above, a reclamping of the brake is optionally provided in order to compensate the clamping force reduction that occurs upon cooling of a hot brake and to guarantee that the vehicle is reliably held in place by means of the brake(s) situated in parking brake position. Under quite particularly adverse operating conditions, in particular given an extremely hot brake, the coefficient of friction $\mu$ may be lower than the tangent of the wedge angle $\alpha$, with the result that the brake is no longer self-locking. Under such circumstances, a braking action in the parking brake position is achievable only by means of a continuous actuator force. This is unsatisfactory owing to a continuous requirement for electrical energy.

For this reason, according to a modified embodiment of the motor vehicle brake system according to the invention, spring-elastic means are disposed between the actuator, which applies the brake in the parking brake function, and the associated friction element and the actuator is of an arrestable, i.e. lockable design. The spring-elastic means may be formed e.g. by a helical spring. Preferably, the spring-elastic means act upon the wedge arrangement of the self-boosting device, i.e. the spring-elastic means are supported against the then locked actuator and ensure a continuous actuating force, without energy being continuously required to generate this actuating force. The desired immobilizing effect of the parking brake is therefore guaranteed also under extremely unfavourable operating conditions without a continuous supply of electrical energy. Given such a refinement, the angle of slope of the described wedge faces need not be selected in such a way that the wheel brakes are self-locking in any case with normally prevailing coefficients of friction between the friction element and the wheel brake component to be braked.

According to a preferred development of the motor vehicle brake system according to the invention, on gradients an activation of the parking brake function is effected automatically after attainment of the stationary state of the vehicle from forward travel. In this way, an unintentional backward rolling of the vehicle is substantially prevented. To enable the motor vehicle brake system to detect whether the vehicle is travelling uphill, either a suitable sensor, e.g. an inclination sensor, may be provided or the information of another vehicle system, which comprises a sensor capable of detecting inclinations of the vehicle, may be used. For example, modern anti-theft alarm systems are often equipped with an inclination sensor.

In an advantageous refinement of the embodiment just mentioned, activation of the parking brake function is effected only after the service brake has been released. The thinking behind this is that backward rolling of the vehicle is unable to occur so long as the service brake is actuated, so that this refinement prevents unnecessary activation of the parking brake function. According to a further developed refinement, activation of the parking brake function is not effected until a predetermined length of time after release of the service brake. This is to enable the driver of a vehicle, after the stationary state of the vehicle has been reached, to execute a normal start-up operation, e.g. by engaging first gear and then releasing the clutch, without the parking brake function having already been activated. It is only after a predetermined length of time, which may for example be so selected that a normal start-up operation is bound to have been completed, that activation of the parking brake function is optionally effected, i.e. if the vehicle rolls backwards. Unintentional backward rolling of the vehicle for a longer period is therefore prevented.

In addition to triggering the parking brake function after attainment of the stationary state of the vehicle from forward travel, in modified embodiments of the previously described motor vehicle brake system an activation of the parking brake function may also be effected automatically after attainment of the stationary state of the vehicle from reverse travel. So that intentional reverse travel is possible, this automatic activation of the parking brake function is effected preferably only when no gear of the vehicle transmission is engaged. Here, by "gear" is meant in particular reverse gear and/or first gear.

According to a further modification of the previously discussed motor vehicle brake system, in which activation of the parking brake function on gradients is effected automatically at least after attainment of the stationary state of the vehicle from forward travel, this activation is moreover effected only when a predetermined friction torque in backward rolling direction is exceeded. An automatic activation of the parking brake function accordingly occurs only when, despite the service brake being actuated, a backward rolling of the vehicle occurs. It is then assumed that such backward rolling is an unintended event, and the parking brake function that then comes into effect prevents further backward rolling. The friction torque in backward rolling direction may be determined e.g. with the aid of sensors that are in any case provided at the self-boosting electromechanical wheel brake for friction torque control during a service braking operation.

All embodiments of the motor vehicle brake system according to the invention are preferably refined in such a way that an activation of the parking brake function is effected automatically with switching-off of the motor vehicle engine. The thinking behind this is that, after the motor vehicle engine is switched off, no further movement of the vehicle is desired. For special situations, e.g. to enable pushing or towing of a broken-down vehicle, there is then preferably a switch, which effects the overriding of the automatic activation.

The present invention also provides an electromechanical wheel brake for use in a motor vehicle brake system according to the invention, comprising an electric actuator for generating an actuating force and a self-boosting device for automatically boosting the actuating force generated by the actuator in order to press a friction element against a rotatable brake component that is to be braked, e.g. against a brake disc. The self-boosting device comprises a wedge, which is supported against an associated abutment and has at least one wedge face disposed at an angle of slope that is so selected that the wheel brake in any case with normally prevailing coefficients of friction between friction element and brake disc is self-locking. The actuator has two drives, which are designed in such a way that they may act in the same direction or in opposite directions upon the wedge in order during service braking operations to enable a backlash-free actuation of the wedge, and in order moreover in a parking brake position of the brake to be able to give the wedge a clearance that enables an automatic further application of the wheel brake by means of external forces acting upon the vehicle.

The friction element or each friction element is preferably provided with a friction lining, which has a large jump in the coefficient of adhesion between static and sliding friction. In conventional brakes a large jump in the coefficient of adhesion between static and sliding friction is not desired, rather this jump in the coefficient of adhesion is to be as small as possible there in order to achieve as smooth as possible a braking operation up to the stationary state of the vehicle. In a wheel brake according to the invention, on the other hand, a large jump in the coefficient of adhesion is advantageous especially for the parking brake function because, after the first distance-controlled application of each wheel brake in the parking function, this large jump prevents the action of even small external forces upon the stationary vehicle from causing a "slipping" of the wheel brakes and hence a movement of the vehicle. What is more, the fact that the static friction is clearly greater than the sliding friction ensures that in the parking brake function the automatic further application of the wheel brakes owing to external forces acting upon the vehicle occurs.

As already mentioned, under very adverse operating conditions, in particular when a brake is extremely hot, the coefficient of static friction $\mu$ between the friction element and the brake disc may become lower than the tangent of the wedge angle $\alpha$, with the result that the brake is then no longer self-locking. This means that in the parking brake position an actuator force has to be summoned up continuously in order to achieve the desired immobilizing effect. To avoid this, according to an embodiment of the electromechanical wheel brake according to the invention it is provided that the actuator of the brake is selectively arrestable, i.e. lockable, and that between the actuator and the friction element spring-elastic means act and exert a brake application force upon the friction element. The spring-elastic means may be formed e.g. by a helical spring that exerts pressure in the parking brake position. In the parking brake position the spring-elastic means are supported against the actuator, which is then locked against displacement, and continuously exert a force upon the friction element. Preferably, the spring-elastic means act upon the wedge of the self-boosting device of the electromechanical brake according to the invention.

According to an embodiment, the electric actuator of the wheel brake comprises two drives in the form of linear actuators, which are both workingly connected in each case by a push rod to the wedge of the self-boosting device. The two linear actuators upon a brake actuation may operate in the same direction or in opposite directions, depending on the operating state. In one embodiment, the spring-elastic means, which exert a pressing force in the parking brake position, are disposed between the ends of the push rods of the two linear actuators. In another embodiment, the spring-elastic means are disposed between the end of the push rod of the linear actuator that brings the brake into the parking brake position and the wedge arrangement of the self-boosting device. In all of the previously described embodiments, the spring-elastic means ensure the desired immobilizing effect of the wheel brake also under the discussed adverse operating conditions and without a power supply.

In a preferred embodiment of the self-boosting electromechanical wheel brake according to the invention, for releasing the wheel brake from the parking brake position under adverse operating conditions, e.g. after long stationary periods, there is an additional separate drive. This drive preferably comprises a step-down worm gear, so that the drive may be kept small. In an advantageous refinement, the worm gear and the separate drive are components of an adjusting device of the wheel brake for compensating friction lining wear.

Figure 3:
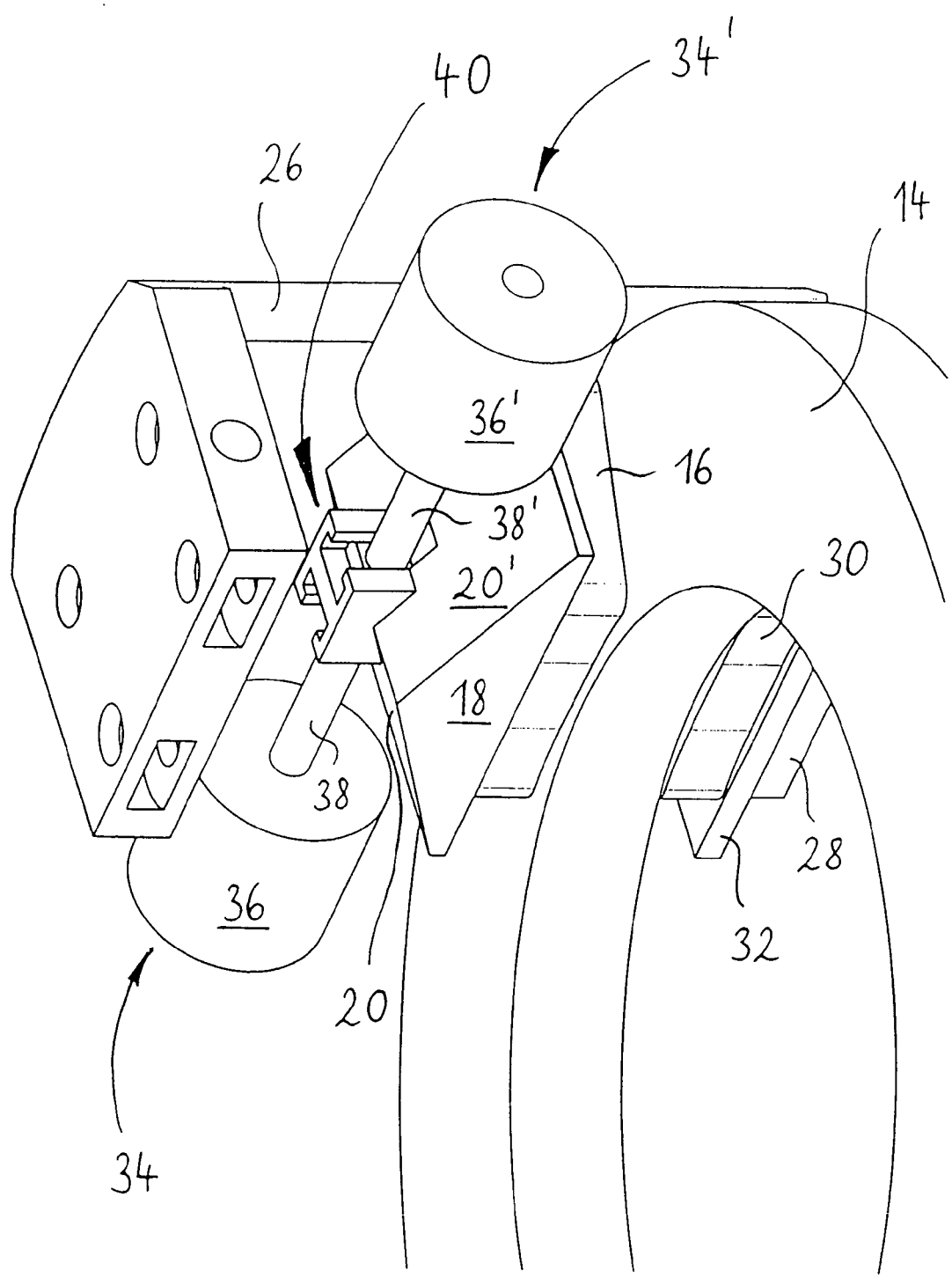
Figure 4:
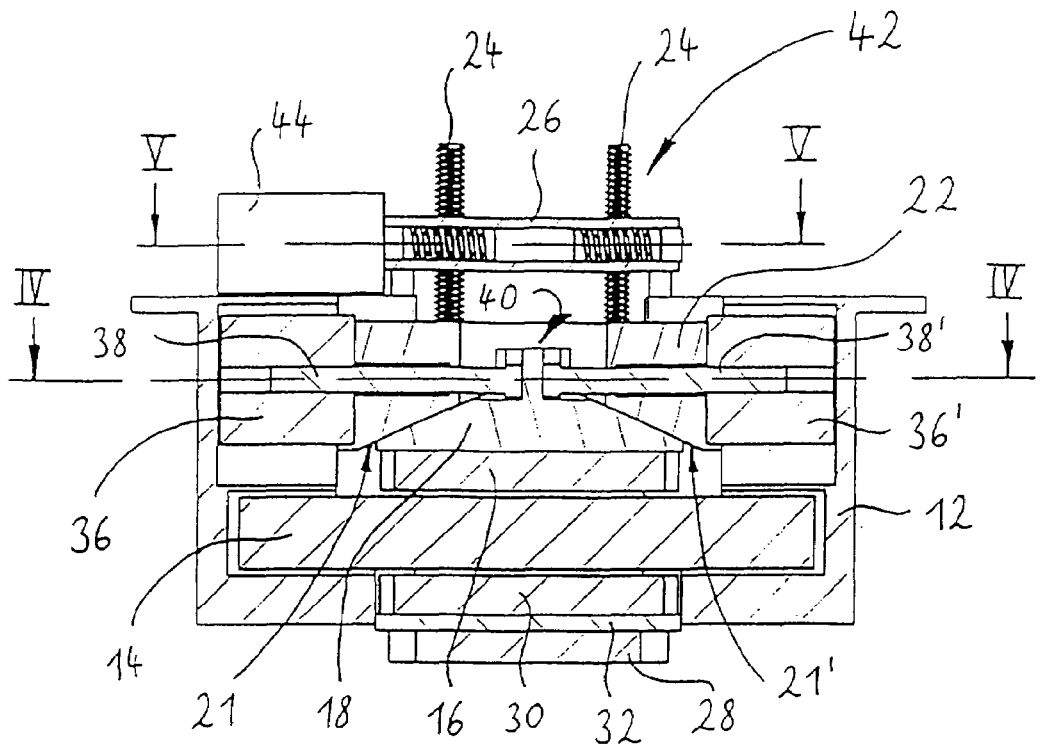
Figure 7:
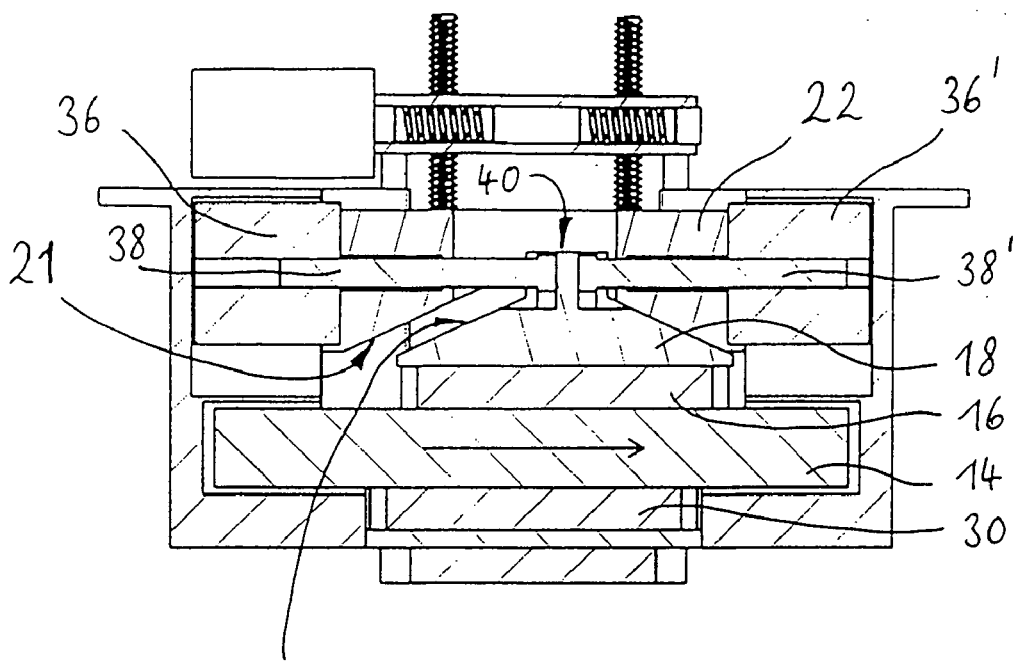
Figure 8:
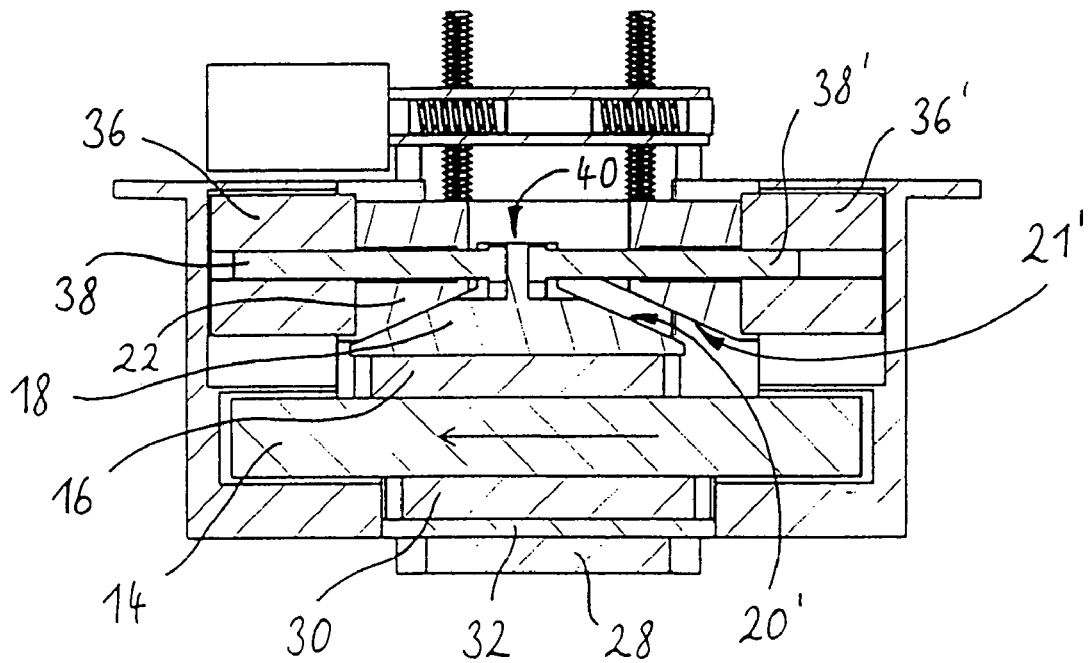
Figure 9:
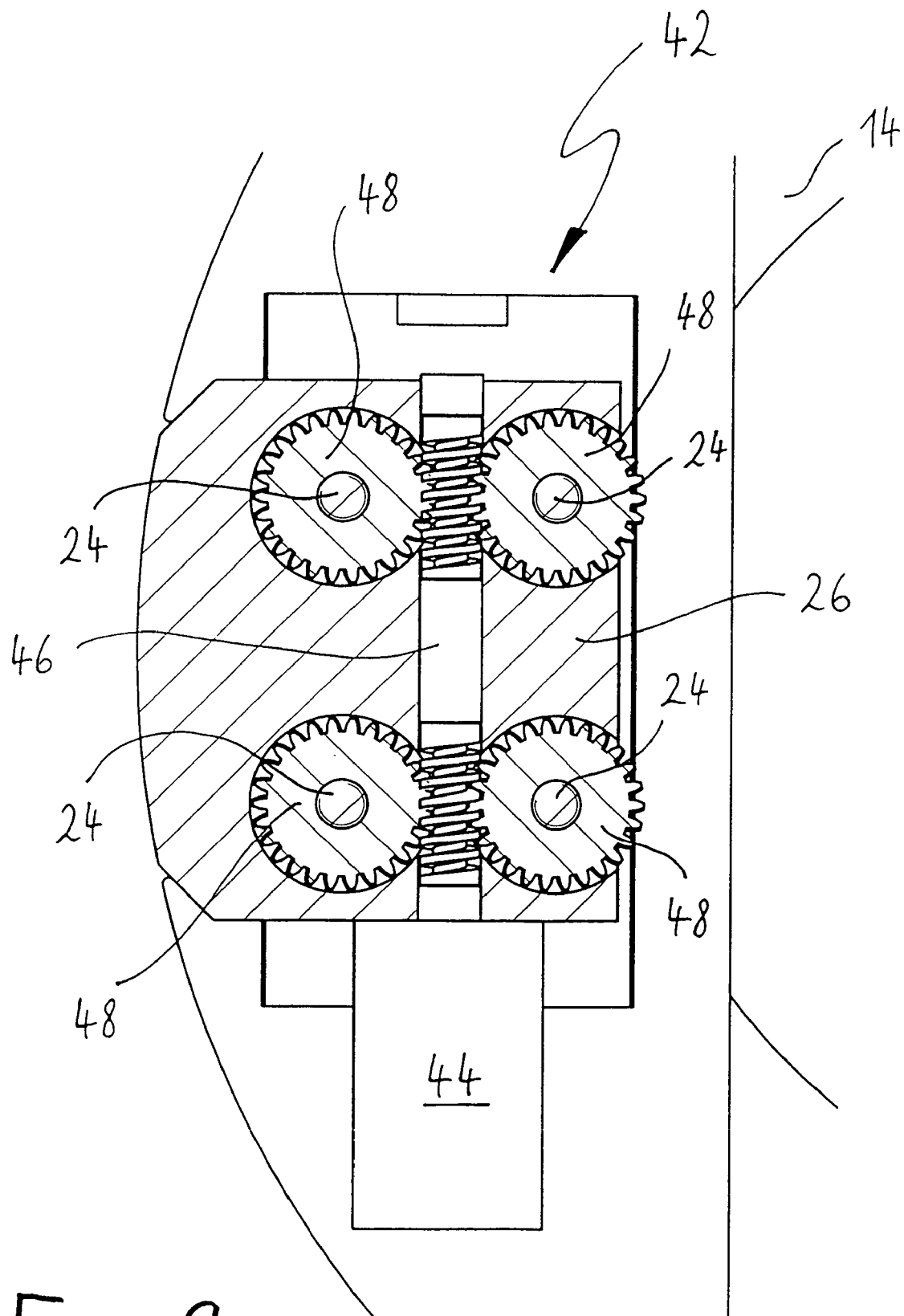
Figure 10:
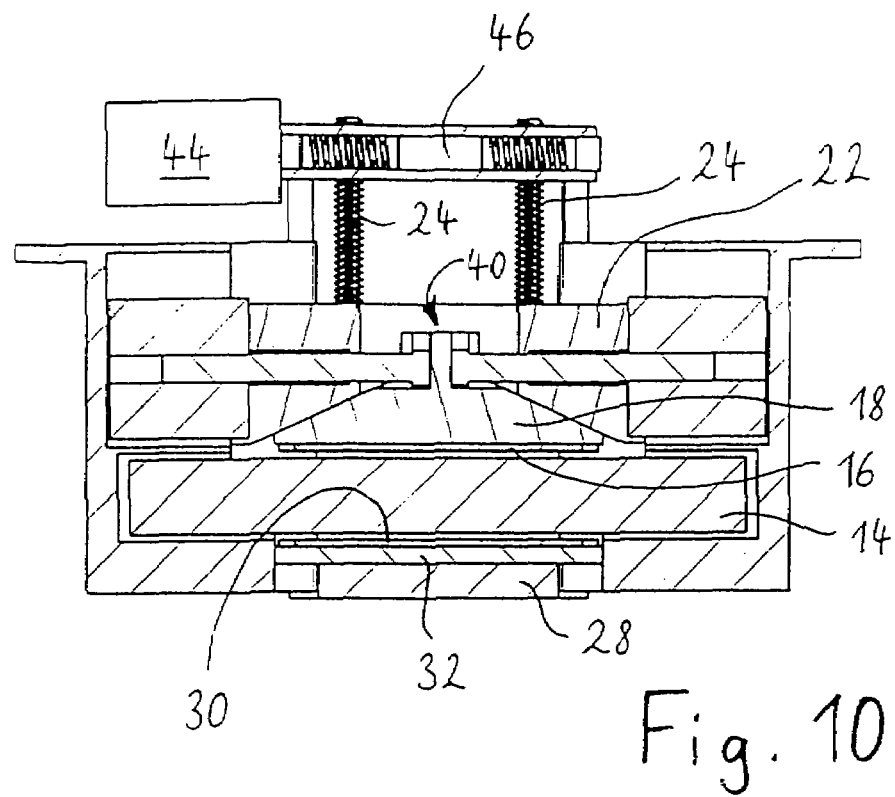

Embodiments of a brake according to the invention are described in detail below with reference to the accompanying diagrammatic drawings. The drawings show:

FIG. 1 a side view of an electromechanical brake according to the invention in the form of a disc brake, FIG. 2 a three-dimensional view of the brake according to the invention obliquely from below, FIG. 3 the view of FIG. 2 without adjusting apparatus and abutment, FIG. 4 the section II—II from FIG. 1, FIG. 5 the section III—III from FIG. 1, FIG. 6 the section IV—IV from FIG. 4, FIG. 7 a sectional view according to FIG. 4 showing the actuated state of the brake according to the invention during forward travel, FIG. 8 the sectional view of FIG. 7, now however showing the actuated state of the brake during reverse travel, FIG. 9 the section V—V from FIG. 4, FIG. 10 the sectional view of FIG. 4 with extensively worn friction linings, FIG. 11 a diagram illustrating the basic function of the brake according to the invention, FIG. 12 a sectional view of a modified embodiment of an electromechanical brake according to the invention in the form of a disc brake, wherein in FIG. 12 the released state of the brake is shown, FIG. 13 the view of FIG. 12 in an actuated state of the brake, and FIG. 14 an embodiment modified compared to FIGS. 12 and 13.

Figure 2:
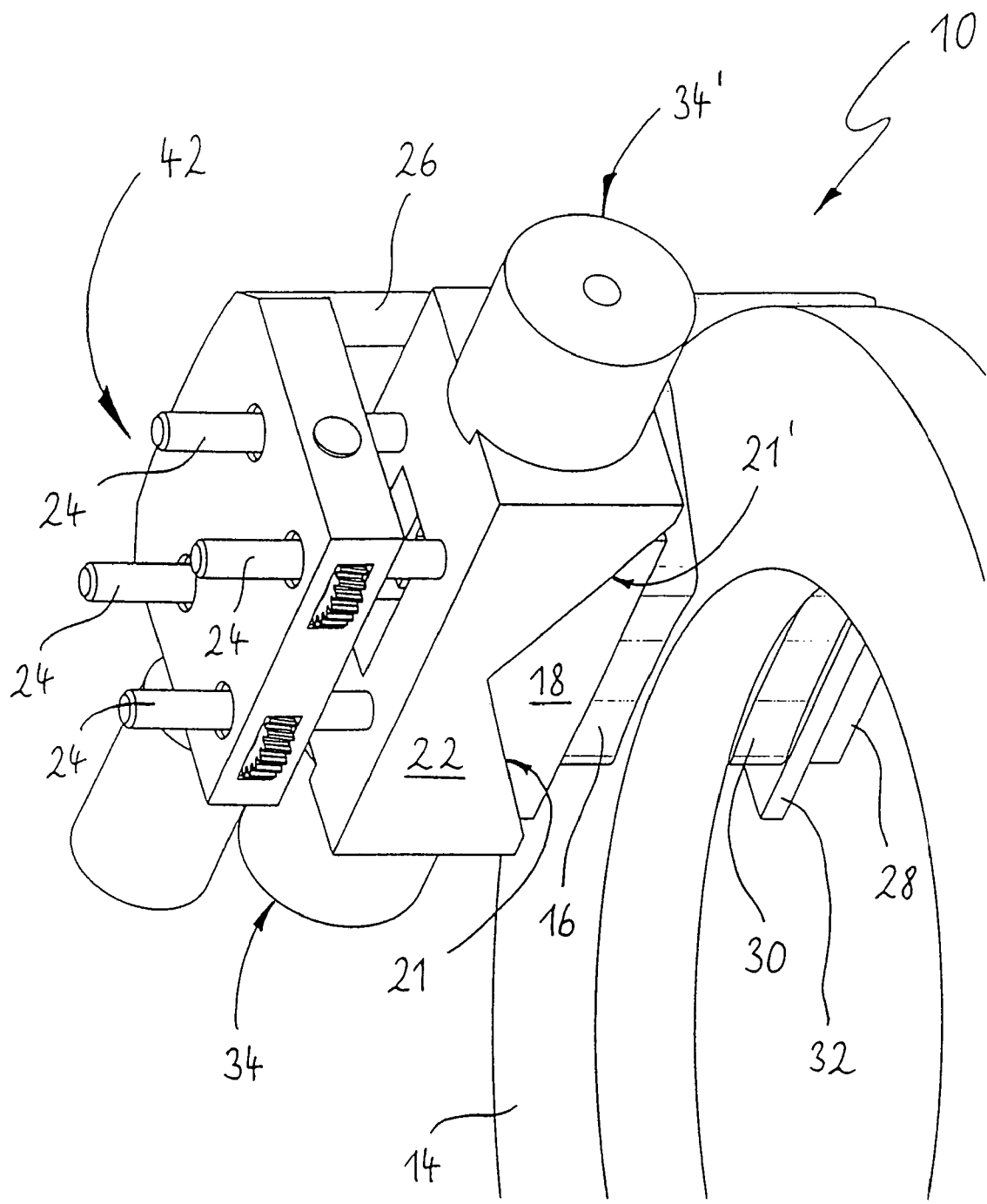

FIGS. 1 and 2 show an electromechanical brake 10 in the form of a disc brake, comprising a housing 12 and a brake disc 14 rotatable about an axis A.

Figure 5:
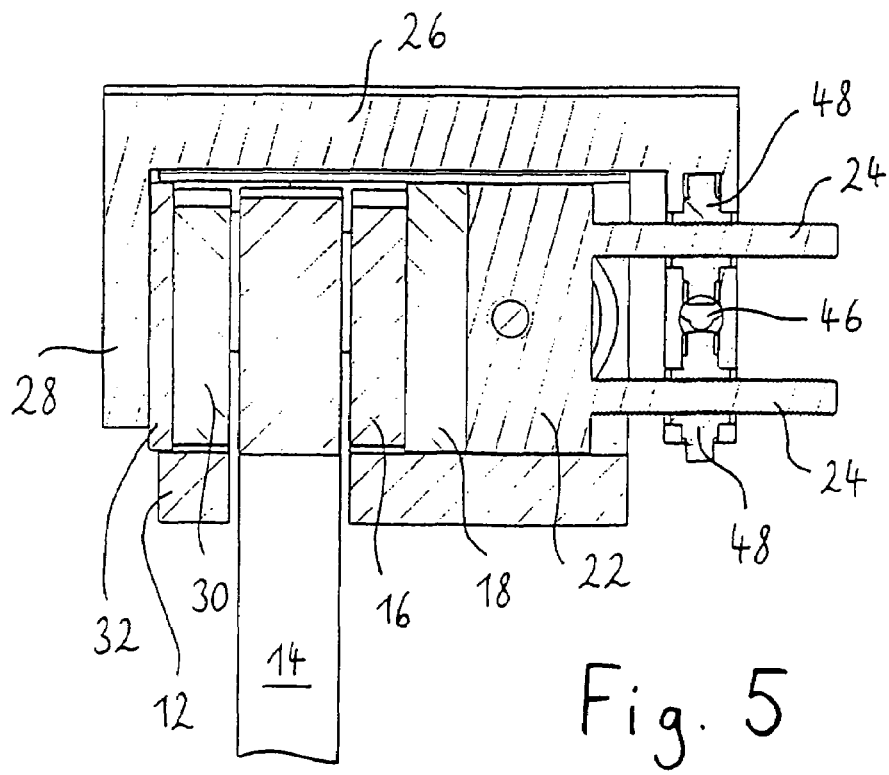

As may be seen more clearly from FIGS. 3, 4 and 5, the brake 10 has a first friction lining 16, which is firmly connected, e.g. glued, to the front of a wedge 18 serving as a lining carrier. At its rear, the wedge 18 has for each direction of rotation of the brake disc 14 a wedge face 20 and/or 20', which are both disposed at an angle of slope α relative to the brake disc 14 and supported against complementary wedge faces 21, 21' of a block-shaped abutment 22.

The abutment 22 is supported by means of four threaded bolts 24 against a brake caliper 26 (see FIGS. 2 and 5), which spans the brake disc 14 and has an arm 28 directed towards the axis of rotation A. The arm 28 is used to support a second friction lining 30, which is fastened in a conventional manner on a brake lining plate 32, which lies adjacent to the inner side of the arm 28 facing the brake disc 14.

The actuating force of the brake 10 is generated by an electric actuator, which comprises two drives 34 and 34' designed here as linear actuators. Each drive 34, 34' comprises an electric motor 36, 36' and a push rod 38, 38' driven thereby and workingly connected to the wedge 18. In the embodiment illustrated here, each electric motor 36, 36' has an integrated spindle nut (not shown) and the push rods 38, 38' are designed in each case as a spindle interacting with the spindle nut. By means of a likewise non-illustrated angle-of-rotation sensor in each electric motor 36, 36' the exact position of the associated push rod 38, 38' may be determined on the basis of the revolutions executed by the electric motor 36 or 36' and the lead of the spindle s mechanism.

The wedge 18 and the abutment 22 are part of a self-boosting device for boosting the actuating force generated by the drives 34, 34'. For this purpose, the free ends of the push rods 38 and 38' are mounted in such a way in a receiver 40 disposed at the rear of the wedge 18 that a translational movement of the push rods 38, 38' leads to a corresponding displacement of the wedge 18 to the left or to the right (see FIGS. 3, 4 and 6). To actuate the brake 10, therefore, the wedge 18 with the friction lining 16 fastened thereon is displaced in the direction of rotation of the brake disc 14 (see FIGS. 7 and 8), namely by means of a translational movement of the two push rods 38 and 38'. In said case, the wedge 18 is supported by its one wedge face 20 or 20' against the associated, complementary wedge face 21 or 21' of the abutment 22 and moves not only to the left or right but also towards the brake disc 14. As soon as the first friction lining 16 comes into contact with the brake disc 14, a reaction force arises and is transmitted from the friction lining 16 via the wedge 18 and the abutment 22 to the brake caliper 26. The brake caliper 26 is float-mounted on the housing 12 of the brake 10 and is displaced by the said reaction force until the second friction lining 30 is likewise applied against the brake disc 14 (floating caliper principle). Each further translatory displacement of the wedge 18 in actuating direction then leads to a stronger application of the two friction linings 16 and 30 against the brake disc 14 and hence to the desired braking operation. Release of the brake is effected by displacement of the wedge 18 back into its original position shown in FIG. 4. To reduce the friction, the wedge faces 20, 20' and/or the abutment faces 21, 21' may be provided e.g. with rolling bodies (not shown). As illustrated, the receiver 40 is designed in such a way that the wedge 18 may move towards and away from the brake disc 14 without the push rods 38, 38' simultaneously executing this movement.

Figure 6:
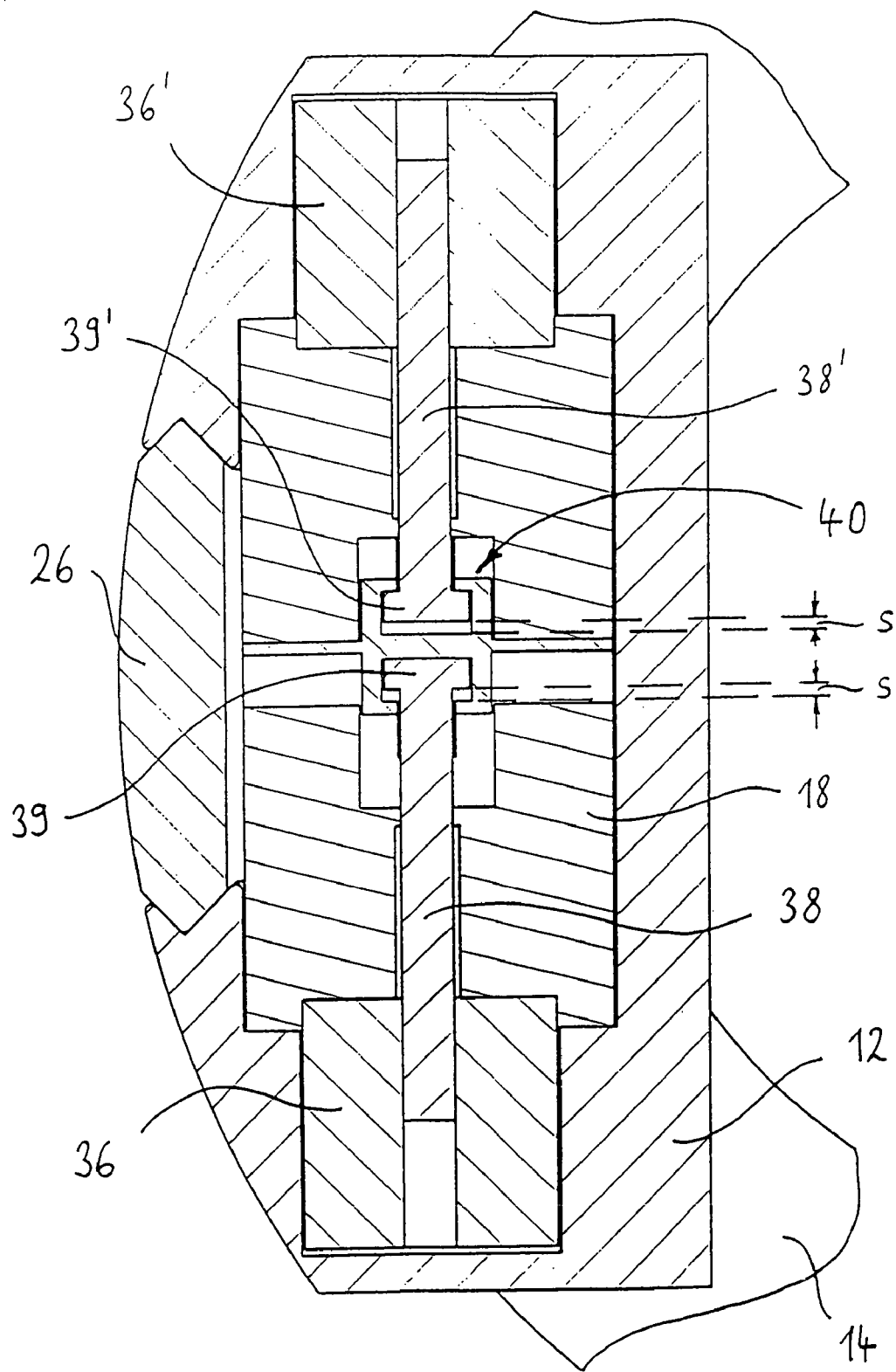

As FIG. 6 reveals, the heads 39 and 39' forming the free ends of the push rods 38 and 38' lie in actuating direction against corresponding faces of the receiver 40. The dimensions of the push rod heads 39, 39' are so selected that in the receiver 40 at the side of each head 39, 39' remote from the actuating direction there is a clearance s. After the brake has been applied to achieve a parking brake function, this clearance s makes it possible for external forces, which are acting upon the vehicle and endeavouring to shift it, to effect an automatic further application of the brake, thereby preventing an unintentional movement of the vehicle. During an automatic further brake application effected because of external forces acting upon the vehicle the clearance s is used up, i.e. an automatic further application of the brake may occur only up to the point when the faces of the receiver 40, which were originally not in contact with the heads 39 and 39', strike against the heads 39, 39'. The clearance s has then relocated to the respective other side of the heads 39, 39'. By means of a practically zero-force correction of the push rod heads 39 and 39' the originally existing state may be restored, i.e. the clearance s may be shifted back to the side of the heads 39, 39' illustrated in FIG. 6. Once the original clearance s has been restored in this way, there is no longer anything to prevent a further automatic application of the brake.

The "zero-force" correction of the push rod heads 39, 39' or, in more general terms, of the electric actuator occurs after a distance-controlled brake application that is effected at the start of a parking brake function in order to apply the friction linings against the brake disc 14 and achieve a specific minimum brake application force. Because the correction is effected with a negligibly low force, the push rod heads 39, 39' are actually moved only when the originally existing clearance s has already been used up, e.g. because the vehicle is parked on a slope and the slope output force acting upon the vehicle has led, immediately after the initially effected distance-controlled brake application, to an automatic further application of the brake. If, on the other hand, the original clearance s still exists, the "zero-force" correction does not lead to any change of the conditions and is terminated after a predetermined time interval has elapsed.

So that the brake 10 may compensate the wear of a friction lining 16, an adjusting device generally denoted by 42 is provided (see FIG. 2). This device comprises (see FIGS. 4, 5 and 9) a motor 44, which drives a worm shaft 46, which is in mesh with four gear wheels 48. The gear wheels 48 are mounted in the brake caliper 26 and each have an internal thread, which is in engagement with an appropriate one of the threaded bolts 24 firmly connected to the abutment 22 (see FIG. 5). The gear wheels 48 accordingly operate as spindle nuts of a spindle mechanism, while the threaded bolts 24 are the spindle rods. In the illustrated embodiment there are four threaded bolts 24, of which because of the different direction of rotation of the gear wheels 48 two threaded bolts 24 have a left-hand thread and the other two threaded bolts 24 have a right-hand thread. By means of the motor 44 the adjusting device 42 may therefore increase the distance of the abutment 22 from the brake caliper 26, i.e. move the abutment 22 towards the brake disc 14. Thus, the release clearance of the brake 10, i.e. the distance that exists between the brake disc 14 and the friction lining surface in the released state of the brake, may be kept constant. FIG. 10 shows this in a view according to FIG. 4, but with extensively worn friction linings 16, 30.

Usually the brake 10 will be so designed that, if during a braking operation too large a release clearance is detected, a closed-loop control circuit activates the adjusting device 42 in the released state of the brake in order to reduce the release clearance back to the design specification value. The adjusting device 42 is preferably of a self-locking design in order to prevent an unintended adjustment of the release clearance.

The adjusting device 42 described here is one possibility of compensating the friction lining wear. Other embodiments of the brake 10 may have, instead of the said electric motor 44, an ultrasonic motor, a sequence processor, a stepping motor or another drive. The gear of the adjusting device 42 may also be designed differently, e.g. in the form of a harmonic drive gear. Furthermore, there need not be four threaded bolts 24, as illustrated, rather there may be a higher or lower number of threaded bolts and, finally, means other than threaded bolts are conceivable for achieving the described relative displacement of the abutment 22.

Figure 11:
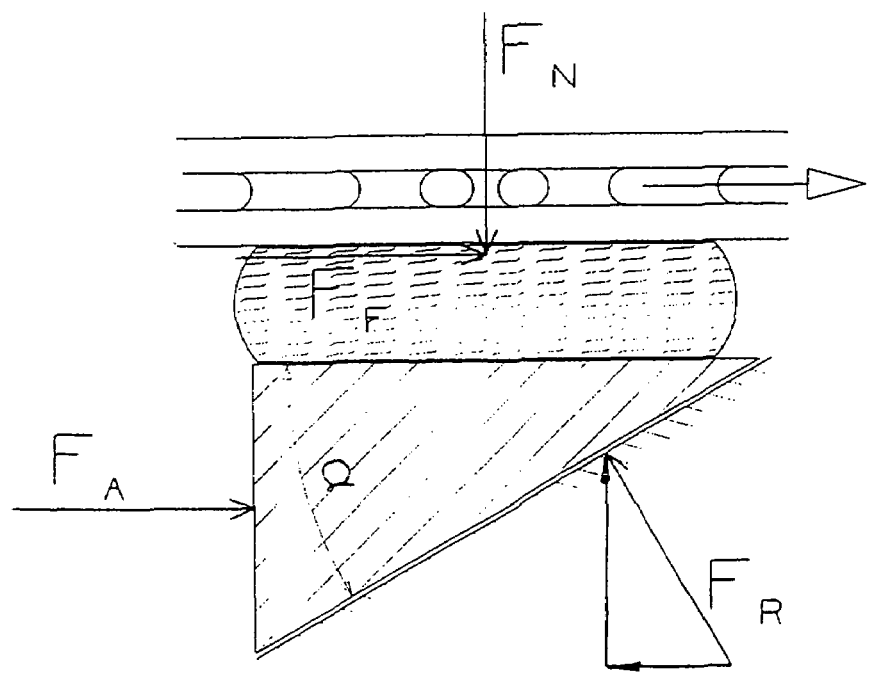

There now follows a detailed functional description of the electromechanical brake 10 and, in particular, of the self-boosting device with reference to FIG. 11. It has already been mentioned that the self-boosting device has, for each direction of rotation of the brake disc 14, a wedge face 20 and/or 20' that is supported against a complementary face 21 and/or 21' of the abutment 22. In the illustrated embodiment, each wedge face 20, 20' is disposed at an effective wedge angle α relative to the brake disc 14. However, this need not necessarily be the case, rather the effective wedge angle for the one direction of rotation may differ from the effective wedge angle for the other direction of rotation. In FIG. 11 arrows indicate the forces that act upon the wedge 18.

These are $F_A$ the input force introduced into the wedge 18, $F_R$ the supporting force that arises during a braking operation and is to be supported by the abutment 22 and may be divided into a force $F_{Rx}$ opposed to the input force $F_A$ and a pressing force $F_{Ry}$ perpendicular to the brake disc, $F_N$ the normal force acting on the brake disc in the opposite direction to the force $F_{Ry}$, and $F_F$ the friction force arising at the wedge and/or at the friction element.

According to this equilibrium of forces the friction force and/or the friction torque at the brake disc 14 in accordance with the relationship $$F_A = -F_F \cdot \left[1 - \frac{\tan \alpha}{\mu}\right]$$

depends only upon the angle of slope α, the coefficient of friction μ representing a disturbance variable, and the input force $F_A$.

The input force $F_A$, which acts according to FIG. 11 during a brake actuation upon the wedge 18, is generated by the two drives 34, 34'. With a given coefficient of friction μ, the degree of self-boosting of the introduced force $F_A$ depends only upon the angle of slope α: in the state of equilibrium, i.e. when the value of the coefficient of friction μ equals the tangent of the angle of slope α, the brake 10—when the friction lining 16 is in contact with the brake disc 14—does not require any more input force $F_A$ for the further braking operation. This state of equilibrium is therefore described as the optimum self-boosting point. If μ is lower than tan α, an input force $F_A$ has to be present to maintain a braking operation. If, on the other hand, μ is greater than tan α, the brake runs in by itself, i.e. the brake force is boosted without the presence of an input force $F_A$ progressively up to locking of the brake. If this locking state is to be avoided and/or a desired brake force maintained, a negative input force $F_A$, i.e. an input force $F_A$ acting in the opposite direction, has to be applied onto the wedge 18.

So that the input force $F_A$ may be low, it is desirable to operate the brake 10 in a range, in which the coefficient of friction μ is at least approximately equal to the tangent of the angle of slope α. In this range of low actuating forces, the two drives 34 and 34' operate counter to one another, i.e. the two drives 34, 34' via the push rods 38, 38' introduce mutually opposed forces into the wedge 18. The opposed forces are in said case so dimensioned that an excess of force results in the direction, in which the wedge 18 is to be displaced upon an actuation. The two forces introduced by the drives 34, 34' into the wedge 18 may both be pressing forces or both be tensile forces, all that matters is that an excess of force results in the desired direction.

By virtue of the two drives 34, 34' operating in opposite directions, the actuation of the wedge 18 is free from backlash. This freedom from backlash is important for operation of the brake 10 in the optimum self-boosting range because in this range the variation of the coefficient of friction $\mu$ during operation of the brake may lead to a rapid change between states, in which $\mu$ is lower than tan $\alpha$, and states, in which $\mu$ is greater than tan $\alpha$. In other words, in the range around the optimum self-boosting point there may be a rapid change between states, in which a positive input force $F_A$ is required, and states, in which a negative input force $F_A$ is needed to maintain a specific, desired brake force. If the actuator were not free from backlash, at each change of sign of the input force $F_A$ the clearance existing in the actuator would be travelled, which would lead to undefined states and hence to poor controllability of the brake. The backlash-free actuation by means of the two drives 34, 34' operating normally in opposite directions effectively avoids this problem.

In operating states, in which the value of the coefficient of friction $\mu$ differs greatly from the tangent of the angle of slope $\alpha$, larger input forces $F_A$ are needed to achieve a desired braking effect. In such operating states, the two drives 34, 34' operate with one another, i.e. they generate forces in the same direction in that one of the drives presses upon the wedge 18 and the other drive pulls on the wedge 18. To enable such an acting of the drives in the same direction, both drives 34, 34' are of a reversible design, i.e. their actuating direction may be reversed. When the drives 34, 34' are operating in the same direction, the actuator of the brake 10 no longer operates free from backlash. In practice, however, this is negligible since operating states, in which increased input forces $F_A$ are needed, occur only rarely and, moreover, in such operating states a possible overtravel of the actuator clearance is tolerable.

As already briefly indicated, the coefficient of friction $\mu$ may vary relatively strongly as a function of the load of the brake. Each variation of the coefficient of friction during a braking operation however leads to a variation of the friction force $F_F$ and hence to a varying deceleration of the brake component to be braked, which is formed mainly by the brake disc 14. To correct these undesirable variations of the coefficient of friction, the illustrated disc brake 10 is provided with a non-illustrated sensor device, which allows continuous measurement of the friction force. This, as such, known sensor device is connected to a likewise non-illustrated, electronic control unit, which evaluates the received signals and in particular carries out a comparison between a preset setpoint value of the friction force and the actual value of the friction force. In accordance with this evaluation of the signals, the drives 34, 34' are controlled by the control unit in such a way that, by displacing the wedge 18 in or counter to the direction of rotation of the brake disc 14, an increase or decrease of the actual value of the friction force is achieved in order to bring the friction force actual value into conformity with the friction force setpoint value.

In the illustrated embodiment, control of the friction force of the brake 10 is achieved through position control of the wedge 18. In terms of control technology this is advantageous because between the wedge position and the coefficient of friction $\mu$ there is merely a linear relationship, which may be controlled easily, quickly and reliably, e.g. by means of a cascade control system comprising an external control loop and an internal control loop. In the external control loop the (desired) brake torque is the controlled variable, while the wedge position is the manipulated variable. In the internal control loop the wedge position is the controlled variable, while the manipulated variable is the motor current or alternatively the motor voltage of the electric motors 36, 36' of the drives 34, 34'. Because of the normally backlash-free actuation of the wedge 18, the position of the wedge 18 may be determined precisely by means of the described angle-of-rotation sensors contained in the electric motors 36, 36'.

In the illustrated embodiment, the angle of slope $\alpha$ is constant over the infeed distance of the brake 10, more precisely of the wedge 18. In non-illustrated embodiments, the angle of slope $\alpha$ is degressive, i.e. decreases with a progressive infeed distance.

Figure 12:
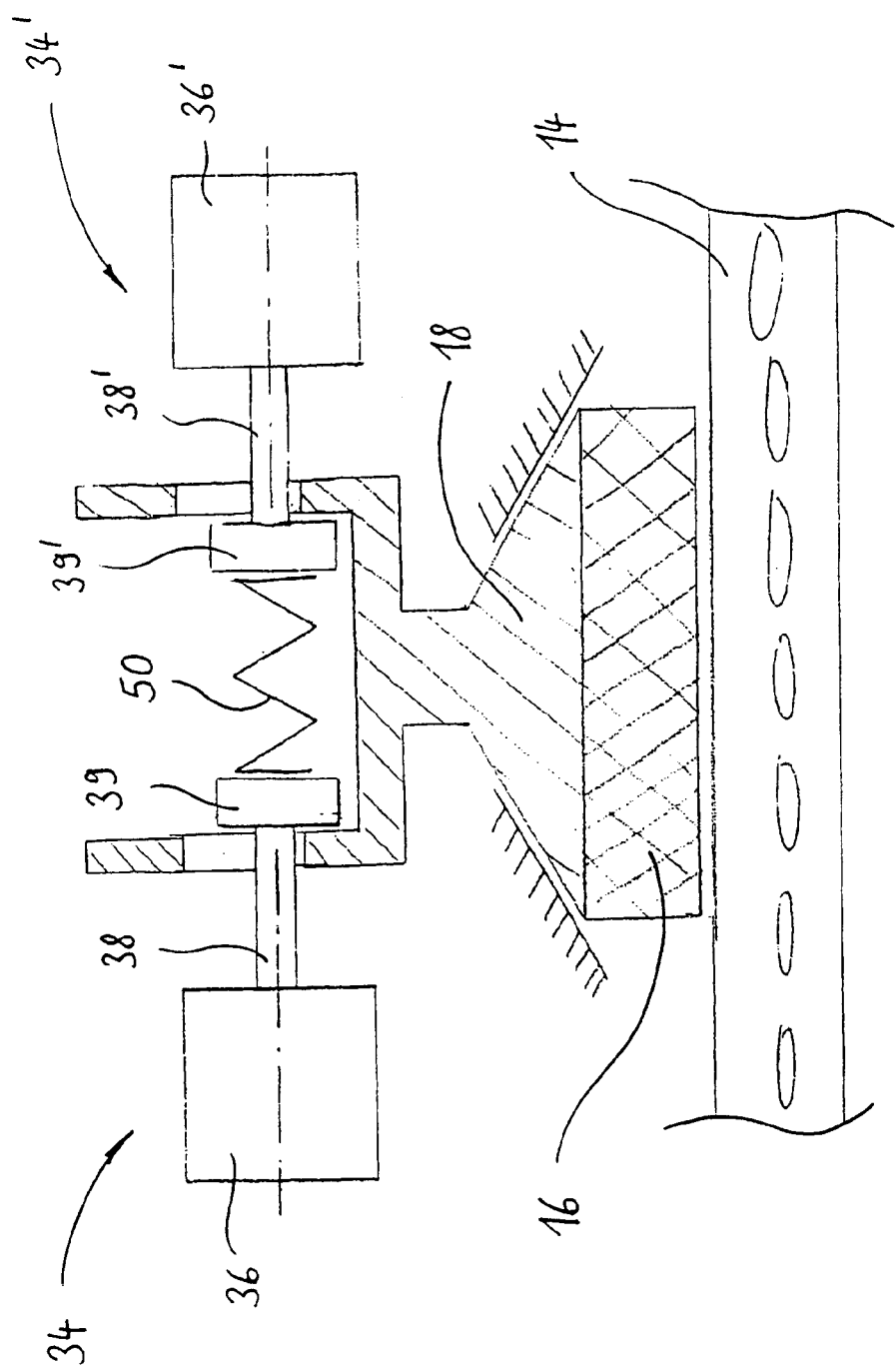

FIG. 12 shows an embodiment of the brake 10 that is slightly modified compared to the previously described embodiment. A spring 50 is disposed as a spring-elastic means between the push rod heads 39 and 39'. Upon an actuation of the brake 10 by means of the drives 34 and 34' in the form of linear actuators, the spring 50 is compressed (see FIG. 13), so that the spring 50 is then able to exert a pressing force.

Figure 13:
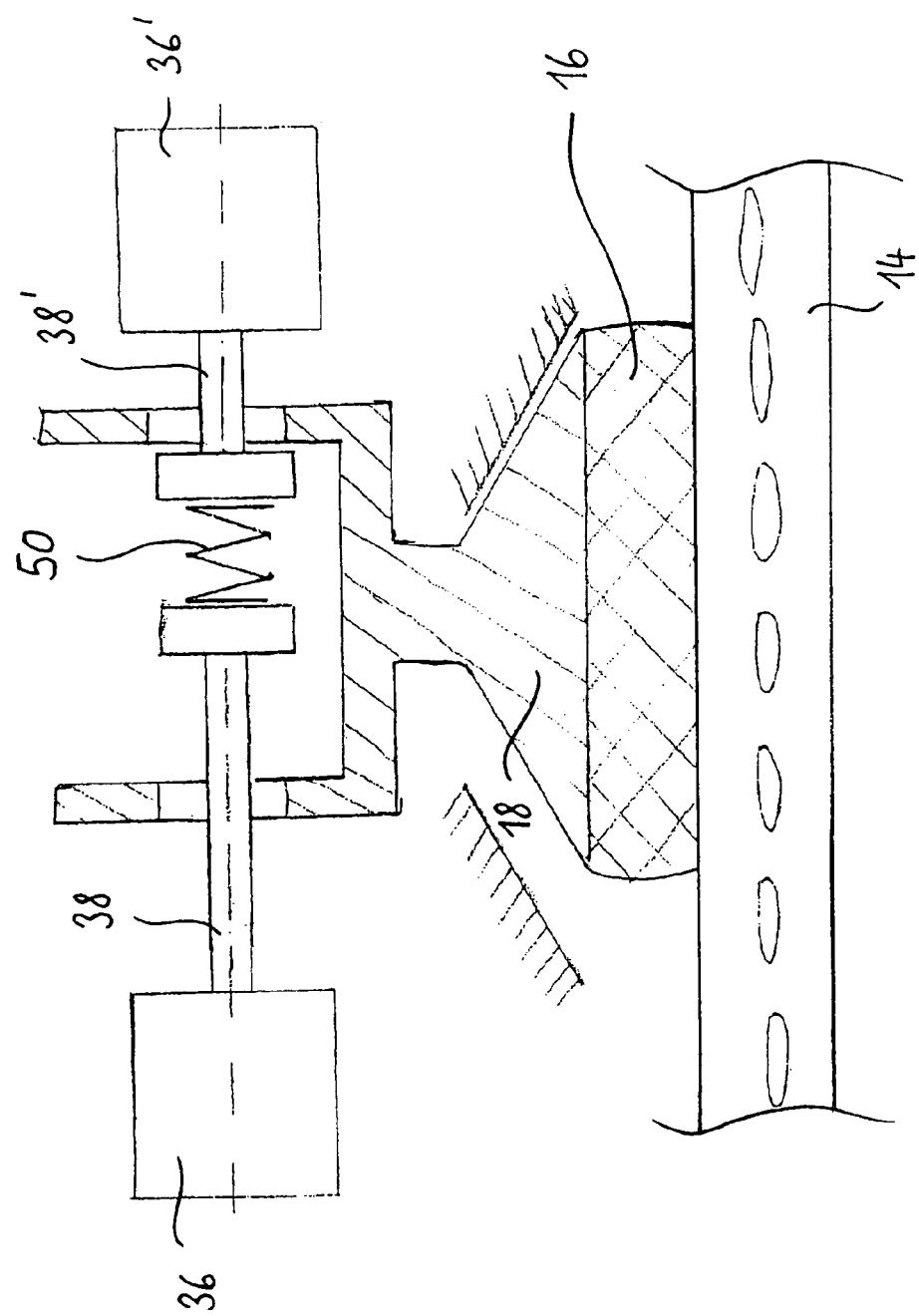

When, as illustrated in FIG. 13, for infeed of the brake 10, i.e. for moving the friction lining 16 towards the brake disc 14, the wedge 18 is to be displaced to the right, this occurs in that both drives 34 and 34' move the wedge 18 to the right. In the view reproduced in FIG. 13, the tensioned spring 50 presses upon the right drive 34' and, via the latter, upon the wedge 18. In order to achieve this, the left drive 34 has to be arrested in the parking brake position, i.e. locked against a translatory displacement, and the right drive 34' may not be of a self-locking design. The arresting of the left drive 34 may be achieved e.g. by means of a locking apparatus (not shown here) for the motor 36 of the drive 34 or by means of a self-locking design of the spindle mechanism that interacts with the electric motor 36. The tensioned spring 50 accordingly in the parking brake position presses continuously upon the wedge 18 and thereby ensures the desired immobilizing effect of the brake 10 even if the coefficient of static friction $\mu$ because of adverse operating conditions should have become so low that the brake 10 is no longer self-locking.

As a rule, it is sufficient to design the brake 10 in such a way that the spring 50 may act only in relation to one direction of rotation of the brake disc 14, i.e. each brake 10 acts as a parking brake in one direction only, e.g. the front wheels are secured against forward travel and the rear wheels against reverse travel. However, it is easily also possible to allow the spring 50 in the parking brake position to act in relation to both directions of rotation of the brake disc 14.

Figure 14:
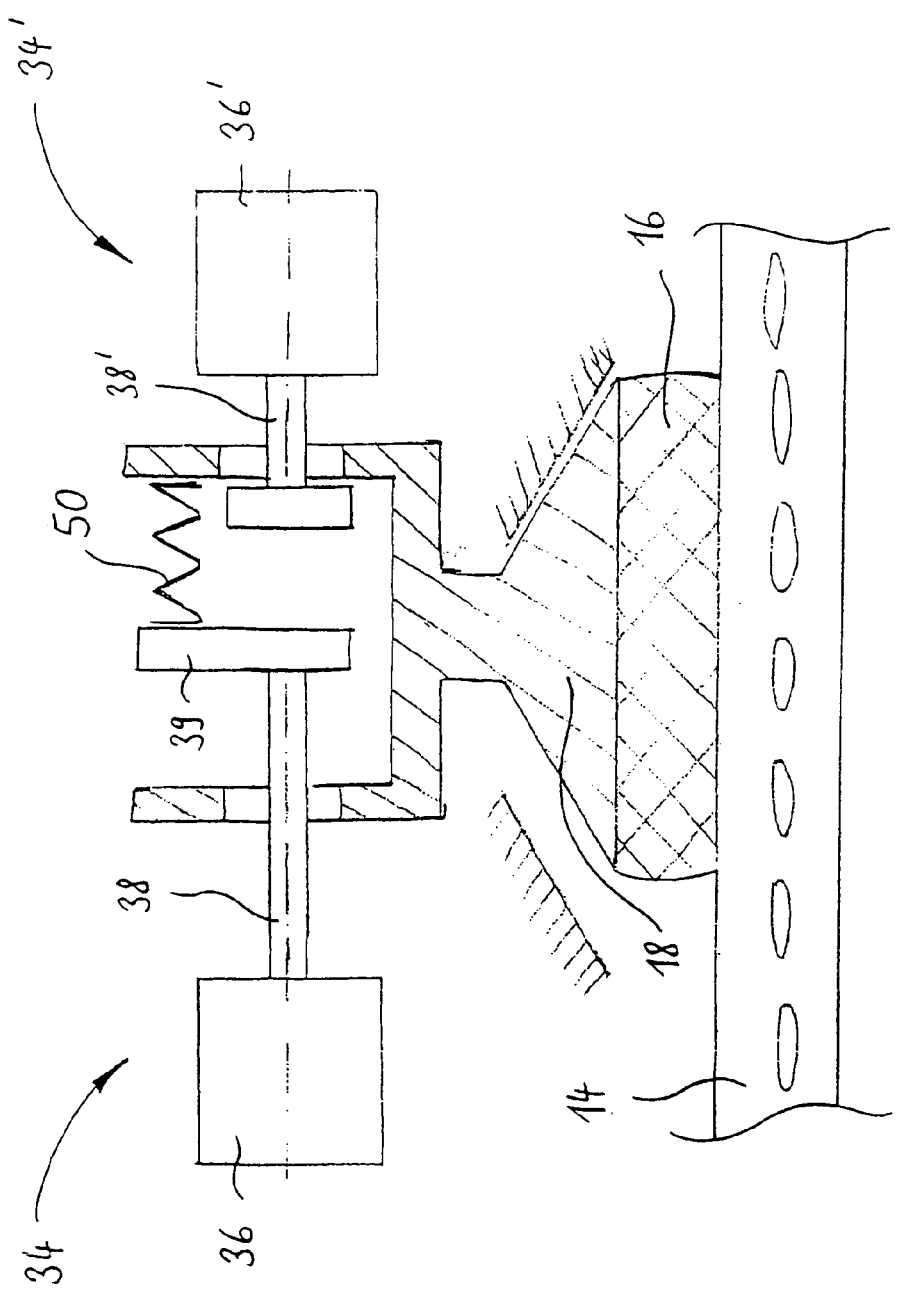

FIG. 14 shows an embodiment of the brake 10, which is once more slightly modified and in which the spring 50 is disposed, not between the two push rod heads 39 and 39', but between the push rod head 39 and a part connected directly to the wedge 18. In such an embodiment, the right drive 34' may also be of a self-locking design.

This invention claimed is:

1. A motor vehicle brake system, comprising:
   at least one first electromechanical wheel brake; and
   at least one second electromechanical wheel brake (10), each first and second electromechanical wheel brake comprising an electric actuator for generating an actuating force, and a self-boosting device for automatically boosting the actuating force generated by the actuator to thereby press a friction element against a rotatable component (14) of the wheel brake (10), wherein each self-boosting device comprises a wedge (18), which is supported against an associated abutment (22) and has at least one wedge face (20, 20') disposed at an angle of slope ($\alpha$), the self-boosting device of the first wheel brake comprising at least one wedge face (20), which is used to boost the force in braking operations during forward travel, the self-boosting device of the second wheel brake comprising at least one wedge face (20'), which is used to boost the force in braking operations during reverse travel, and wherein the friction element of the first wheel brake, by utilizing the wedge face (20) used to boost the force in braking operations during forward travel, and the friction element of the second wheel brake, by utilizing the wedge face (20') used to boost the force in braking operations during reverse travel, are clamped against the rotatable component of the wheel brake (10) to function as a parking brake.

2. A motor vehicle brake system according to claim 1, wherein the angle of slope ($\alpha$) of the said wedge faces (20, 20') is selected in such a way that the wheel brakes (10) in any case with normally prevailing coefficients of friction $\mu$ are self-locking.

3. A motor Meter vehicle brake system according to claim 2, wherein a distance-controlled application of each wheel brake (10) participating in the parking brake function initially occurs and is followed by a zero-force correction of the actuator of each wheel brake (10) participating in the parking brake function.

4. A motor vehicle brake system according to claim 3 wherein the distance-controlled brake application is effected over a predetermined infeed distance up to a predetermined brake application force and is terminated when either the predetermined infeed distance or the predetermined brake application force has been reached, and that the zero-force correction of the actuator is effected only when the predetermined infeed distance has been reached.

5. A motor vehicle brake system according to claim 4, wherein the predetermined brake application force is a fraction of a maximum actuator force, preferably 30% of the maximum actuator force.

6. A motor vehicle brake system according to claim 3, wherein a predetermined brake application force is effected after a predetermined time interval and/or in dependence upon a temperature of brake components relevant to the brake application.

7. A motor vehicle brake system according to claim 3, wherein a further zero-force correction of the actuator of each wheel brake (10) participating in the parking brake function is effected after the distance-controlled brake application external forces acting upon the vehicle have brought about an automatic further application of the wheel brake.

8. A motor vehicle brake system according to claim 1, wherein the actuator is lockable, the system further comprising spring-elastic means between the actuator, and the associated friction element of the wheel brake (10), wherein the spring-elastic means exert an application force upon the friction element in a parking brake position.

9. A motor vehicle brake system according to claim 8, wherein the spring-elastic means act upon a wedge arrangement of the self-boosting device that comprises the wedge face (20, 20') and wherein the spring-elastic means are supported indirectly or directly against the locked actuator.

10. A motor vehicle brake system according to claim 8, wherein the spring-elastic means are formed by a helical spring.

11. A motor vehicle brake system according to claim 1, wherein an activation of the parking brake function is effected automatically on gradients after attainment of a stationary state of the vehicle from forward travel in order to combat a backward rolling of the vehicle.

12. A motor vehicle brake system according to claim 11, wherein activation of the parking brake function is effected only after a service brake of the vehicle has been released.

13. A motor vehicle brake system according to claim 12, wherein activation of the parking brake function is not effected until a predetermined length of time after release of the service brake.

14. A motor vehicle brake system according to claim 11, wherein activation of the parking brake function on gradients is effected automatically after attainment of the stationary state of the vehicle also from reverse travel.

15. A motor vehicle brake system according to claim 14, wherein activation of the parking brake function is effected only when no gear of a transmission of the vehicle is engaged.

16. A motor vehicle brake system according to claim 11, wherein activation of the parking brake function is effected only when a predetermined friction torque in the backward rolling direction has been exceeded.

17. A motor vehicle brake system according to claim 1, wherein activation of the parking brake function is effected automatically when an engine of the vehicle is switched off.

18. An electromechanical wheel brake (10) for use in a motor vehicle brake system, comprising:

an electric actuator for generating an actuating force and a self-boosting device for automatically boosting the actuating force, generated by the actuator in order to press a friction element against a rotatable component (14) of the wheel brake (10), the self-boosting device comprising a wedge (18), which is supported against an associated abutment (22) and has at least one wedge face (20, 20') disposed at an angle of slope ($\alpha$), the actuator comprising two drives (34, 34'), which are so designed that they may act in the same direction or in opposite directions upon the wedge (18) to enable a backlash-free actuation of the wedge (18) during service braking operation, and to give the wedge (18) a clearance in a parking brake position that enables an automatic further application of the wheel brake (10) by means of external forces acting upon the vehicle.

19. A wheel brake according to claim 18, wherein the angle of slope ($\alpha$) is selected so that the wheel brake (10) in any case with normally prevailing coefficients of friction $\mu$ is self-locking.

20. A wheel brake according to claim 18,
wherein the friction element comprises friction linings (16, 30) with a large jump in the coefficient of adhesion between static friction and sliding friction.

21. A wheel brake according to claim 18,
wherein spring-elastic means are disposed between the actuator, which applies the wheel brake (10) in the parking brake function, and the associated friction element of the wheel brake (10), and the spring-elastic means exert an application force upon the friction element, and
wherein the actuator is of a lockable design.

22. A wheel brake according to claim 21,
wherein the actuator comprises an electric motor (36, 26') with a locking apparatus.

23. A wheel brake according to claim 21,
wherein the actuator comprises a spindle mechanism of a self-locking design, which interacts with an electric motor (36, 36').

24. A wheel brake according to claim 21,
wherein the spring-elastic means act upon a wedge arrangement of the self-boosting device that comprises the wedge face (20, 20'), and the spring-elastic means are supported indirectly or directly against the locked actuator.

25. A wheel brake according to claim 21,
wherein the spring-elastic means are formed by a helical spring, which exerts a pressure in the parking brake position.

26. A wheel brake according to claim 21,
wherein the drives (34, 34') are designed as linear actuators which are workingly connected to the wedge (18) by a push rod (38, 38') having a push rod head (39, 39'), and
wherein the spring-elastic means, which in the parking brake position exert an application force upon the friction element, are disposed between the push rod heads (39, 39').

27. A wheel brake according to claim 21,
wherein the drives (34, 34') are designed as linear actuators, which are workingly connected to the wedge (18) by a push rod (38, 38') having a push rod head (39, 39'), and
wherein the spring-elastic means, which in the parking brake position exert an application force upon the friction element, are disposed between the push rod head (39) of the linear actuator that brings the wheel brake (20) into parking brake position and a wedge arrangement comprising the wedge (18).

28. A wheel brake according to claim 18, further comprising an additional separate drive for releasing the wheel brake (20) from the parking brake position.

29. A wheel brake according to claim 28,
wherein the separate drive includes a worm gear.

30. A wheel brake according to claim 29,
wherein the worm gear (46, 48) and the separate drive (44) are components of an adjusting device (42) for compensating friction lining wear.

* * * * *